United States Patent [19]
Nishio et al.

[11] 3,913,058
[45] Oct. 14, 1975

[54] THERMOSENSOR

[75] Inventors: Shinji Nishio, Nagoya; Yoshiro Ushida, Aichi; Shunkichi Nozaki, Nagoya, all of Japan

[73] Assignee: NGK Spark Plug Co., Ltd., Nagoya, Japan

[22] Filed: July 17, 1973

[21] Appl. No.: 380,056

[30] Foreign Application Priority Data
July 25, 1972 Japan.............................. 47-74473

[52] U.S. Cl................... 338/28; 73/343 R; 73/359; 73/362 AR; 136/230; 136/235
[51] Int. Cl.².......................................... G01K 1/08
[58] Field of Search .......... 136/230, 232, 233, 235; 338/25, 28; 73/359, 362 AR, 343 R; 339/30, 183

[56] References Cited
UNITED STATES PATENTS

| | | | |
|---|---|---|---|
| 2,516,952 | 8/1950 | Bristol............................... | 136/233 |
| 2,802,925 | 8/1957 | VonSeelen............................ | 338/28 |
| 3,070,645 | 12/1962 | Tracht ............................... | 136/233 |
| 3,153,769 | 10/1964 | Moses.................................. | 338/28 |

*Primary Examiner*—S. Clement Swisher
*Assistant Examiner*—Denis E. Corr
*Attorney, Agent, or Firm*—Stevens, Davis, Miller & Mosher

[57] ABSTRACT

A thermosensor has improved vibration resistance and sensitivity and is used for measuring a temperature in furnaces, exhaust pipes of gasoline engine and the like.

17 Claims, 6 Drawing Figures

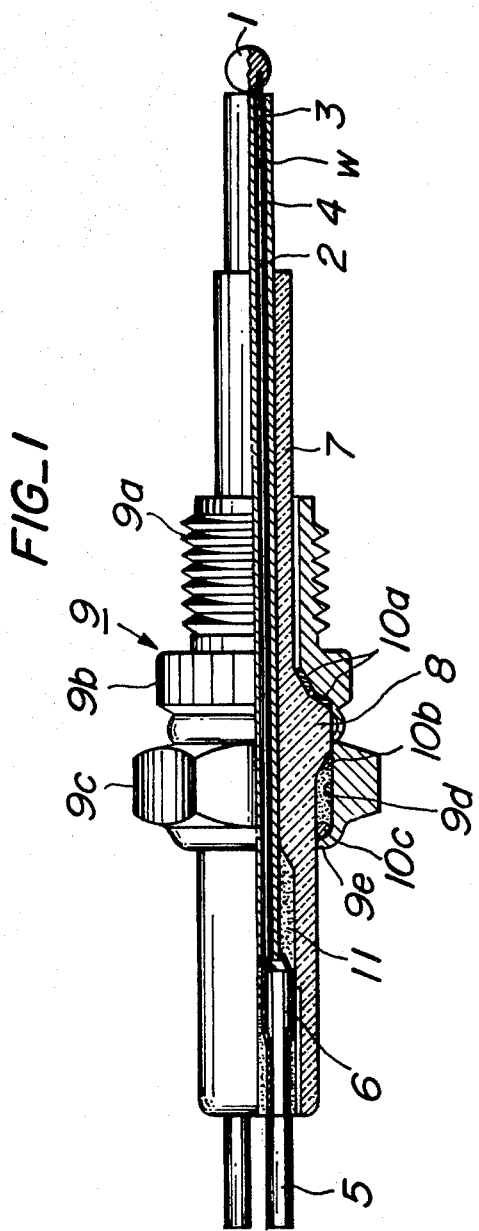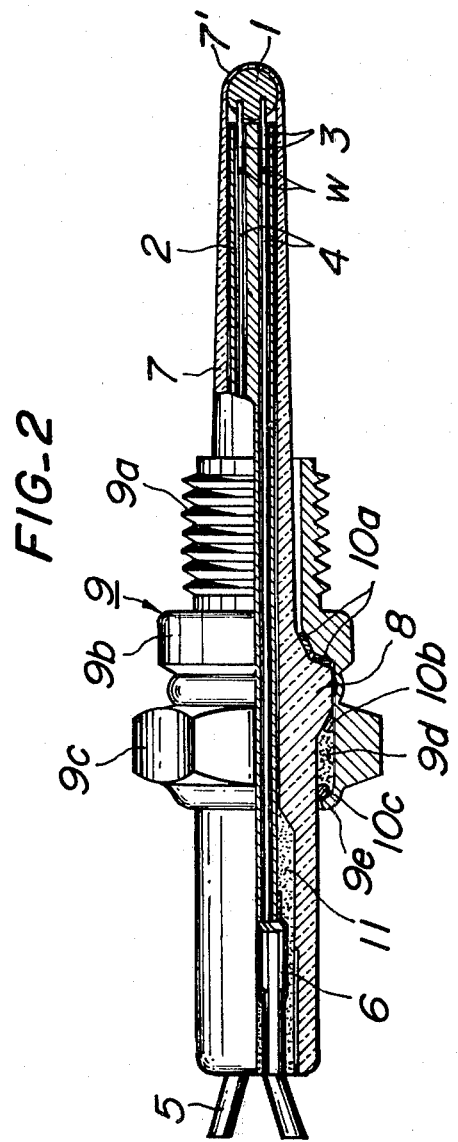

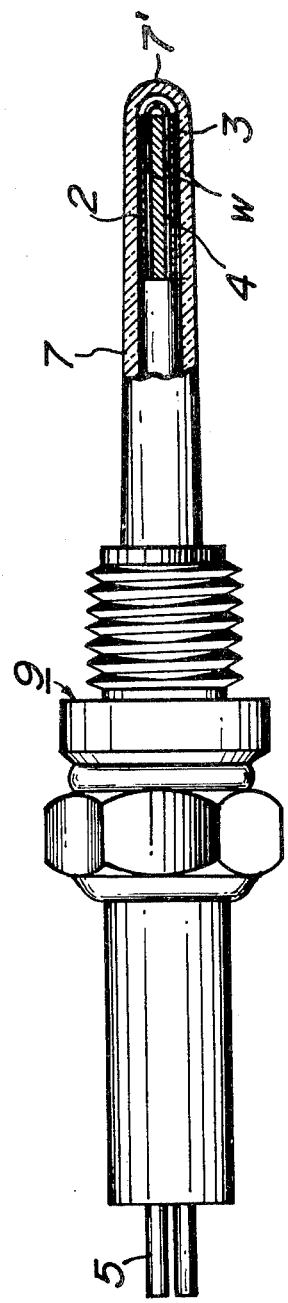
FIG_3
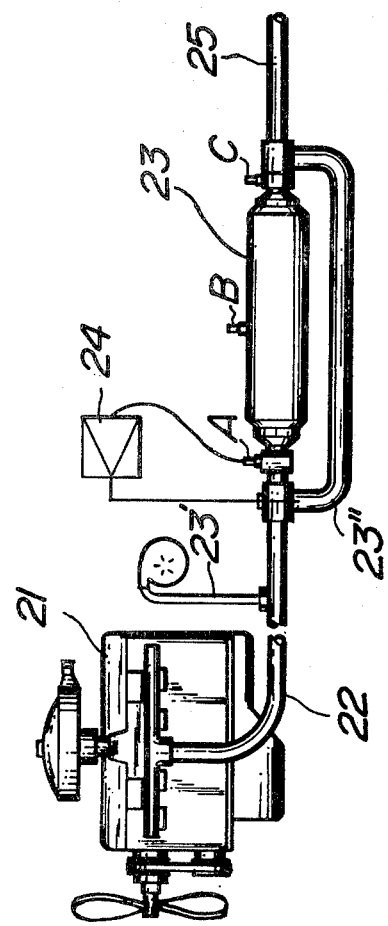
FIG_4

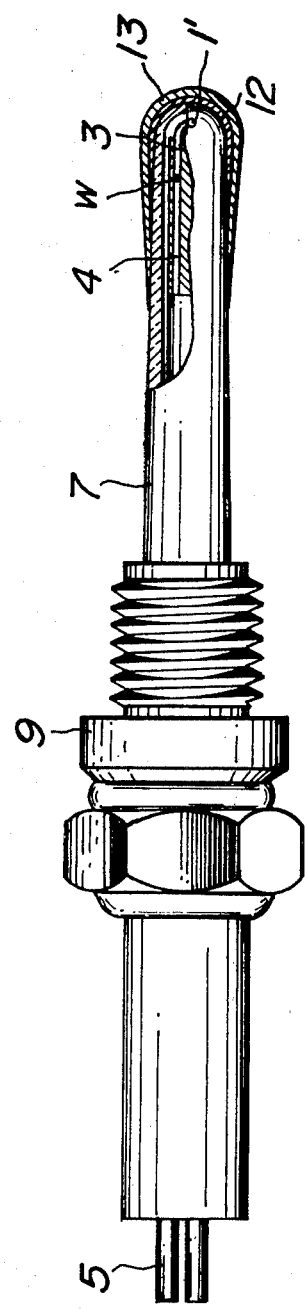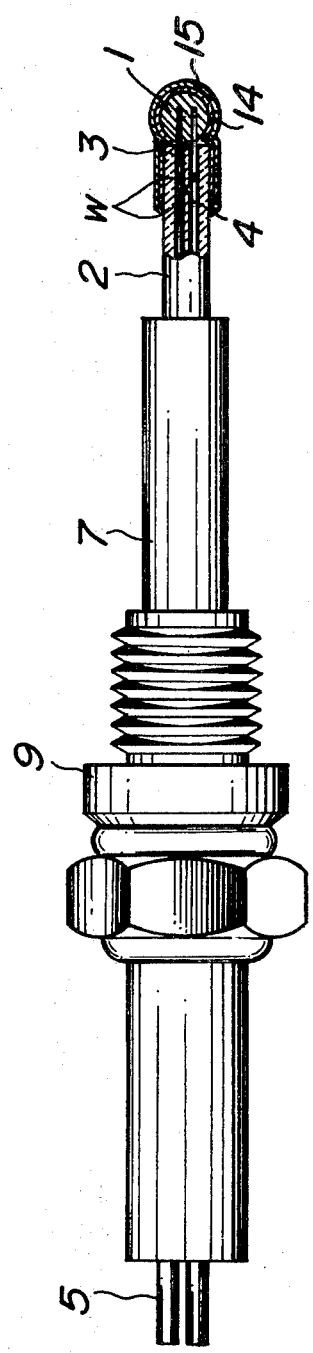

THERMOSENSOR

BACKGROUND OF THE INVENTION

1. Field of the Invention

The present invention relates to an improved thermosensor for measuring a temperature in furnaces, exhaust pipes of gasoline engine or the like when a heat-sensitive portion is exposed to a high temperature atmosphere.

2. Description of the Prior Art

The conventional thermosensor for this use usually comprises a protective tube of a heat-resistant metal, a heat-sensitive portion supported on one end of the tube, two lead wires passed from the said portion through the tube for transmitting a thermoelectric change of the heat-sensitive portion, and an electrically insulating material filled in the space of the tube. In some cases, a plurality of small and short insulating tubes are used to sheathe the lead wires so as to avoid a short-circuit contact. As the heat-sensitive portion of the thermosensor of such a structure, thermocouple, thermistor and the like are used at present.

When the thermosensors of this type are used to measure the temperature in the furnace or the exhaust pipe, however, there is a danger of a disconnection of lead wire and other troubles, becuase the lead wires are apt to be loosely supported with the filling material due to the thermal expansion of the metal protective tube. Particularly, the said danger becomes increased when the thermosensor is used to measure the temperature in an exhaust gas purifying system of an internal combustion engine for vehicle and others, because the thermosensor is subjected to vibration in addition to the thermal expansion.

SUMMARY OF THE INVENTION

An object of the present invention is to eliminate the above described drawbacks of the prior art and to provide an improved thermosensor which can easily be assembled in a simple construction and which endures long use without damaging the performance thereof even in a vibration accompanied system.

Namely, the present invention lies in a thermosensor which comprises a two-holed ceramic tube, a heat-sensitive element formed on one end of the said tube, lead wires each passed through each hole of the said tube so as to transmit a thermoelectric change of the heat-sensitive element during exposure in a high temperature atmosphere, a protective insulating tube having an outward collar and intimately fitted on the two-holed ceramic tube, and a metal fitting closely fixed on the outward collar.

The term "heat-sensitive element" used herein means the hot junction of a thermocouple or the heat-sensitive portion of a thermistor. The protective insulating tube means a ceramic tube made of alumina, beryllia, mullite, silicon nitride, silicon carbide, titanium boride or the like; or a ceramic layer coated on the surface of the heat-sensitive element and/or on the outer surface of the two-holed ceramic tube; or a vitrified glass film coated directly on the surface of the heat-sensitive element. Moreover, the two-holed ceramic tube may be united with the protective insulating tube in an integral part.

The thermosensor of the present invention exhibits an excellent durability even under the vibration action because of the use of the two-holed ceramic tube, and is easy to incorporate into an exhaust pipe system of internal combustion engine for vehicles.

In general, the exhaust gas discharged from the internal combustion engine contains uncombustive components of fuel at a high temperature, which cause an atmospheric pollution. In order to purify the exhaust gas, a reactor, a catalytic converter, an afterburner and the like are now used. However, these devices tend to overheat as the concentration of the uncombustive components increases, and consequently the purification function is lost. In order to effectively prevent such overheating of an exhaust gas purifying device, the thermosensor of the present invention may be used. In this case, the thermosensor may be mounted in an exhaust pipe between the engine and the exhaust gas purifying device, whereby the exhaust gas containing an excessive amount of uncombustive components is quickly detected just on its arrival at the exhaust gas purifying device.

When the heat-sensitive element of the thermosensor is exposed in the exhaust gas, however, the adhesion or deposition of electrically conductive substance such as carbon may take place on the surface of the said element and therefore the temperature detecting performance will be damaged. In such a case, in a preferred embodiment of the present invention, the protective insulating tube is extended over the heat-sensitive element and closed at the extended end thereof to enclose the element therein. Namely, by covering the heat-sensitive element with the protective insulating tube, the surface of the element can be prevented from the deposition of the electrically conductive substances, so that the temperature detecting performance is not damaged and the element operates normally.

When the heat-sensitive element is covered with the protective insulating tube for protecting the element from the deposition or adhesion of the electrically conductive substance, a response of the thermosensor to temperature change may become slow, so that the danger of damaging an exhaust gas purifying device due to overheating may ensue. The danger such as a fire of vehicles equipped with the exhaust gas purifying devices may be likewise the case of using no thermosensor.

The inventors have made various investigations on the present thermosensor in order to prevent the deposition or adhesion of electrically conductive substance and to make the response to temperature change more quick, and found out that if a catalyst capable of promoting the oxidation reaction of the exhaust gas is formed on the surface of the protective insulating tube enclosing the heat-sensitive element, the thermosensor more quickly detects the arrival of the exhaust gas containing a large amount of uncombustive components flowing in the exhaust gas purifying device so as to prevent the overheating of the device.

Therefore, in another preferred embodiment of the present invention, a catalyst layer capable of promoting the oxidation of uncombustive components in the exhaust gas, which may be deposited on a ceramic carrier, is formed on the outer surface of the protective insulating tube at the extended end thereof. The provision of the catalyst layer makes it precisely and advantageously detect the exhaust gas discharged from the internal combustion engine at a high temperature in the exhaust pipe, so that the danger of damaging the exhaust gas purifying device can be precautiously prevented.

The said ceramic carrier to be formed on the outer surface of the protective insulating tube may be preferably employed, considering that the catalyst particles be more firmly supported on the carrier layer surface. As will be explained in the following examples, the above described coating of the ceramic carrier is formed by firstly dipping the protective insulating tube at the heat-sensitive portion into, for instance, a slip mixture of aluminum hydroxide, clay as its binder and some water, and then drying and baking the thus treated portion at a relatively low temperature lower than about 1,000°C to convert the aluminum hydroxide into the γ-alumina. However, the ceramic carrier is not always limited to the said composition and various porous ceramics may be used.

The catalyst substance to be deposited on the outer surface of the ceramic carrier must have a property to promote the oxidation of uncombustive components (CO, hydrocarbons, etc.) in the exhaust gas according to the following equations:

$$CO + \tfrac{1}{2}O_2 \rightarrow CO_2$$

$$CmHn + \left(m+\tfrac{n}{4}\right) O_2 \rightarrow mCO_2 + \tfrac{n}{2}H_2O.$$

As such a catalytic material, use may be made of noble metals such as platinum, palladium, silver and the like; base metals such as copper, chromium, manganese, cobalt, iron, nickel and vanadium or oxides thereof; and a mixture of these metals or a complex thereof.

BRIEF DESCRIPTION OF THE DRAWINGS

For a better understanding of the invention, reference is made to the accompanying drawings, wherein:

FIG. 1 is a side view partly shown in cross-section of an embodiment of the thermosensor according to the present invention;

FIGS. 2 and 3 are side views partly shown in cross-section of another embodiments of the thermosensor according to the present invention, respectively;

FIG. 4 is an illustrative view of an embodiment using the thermosensor of the present invention in an exhaust gas purifying system; and FIGS. 5 and 6 are side views partly shown in cross-section of examples of the thermosensor corresponding to FIGS. 2 and 3 and provided with the catalyst layer according to the present invention, respectively.

DESCRIPTION OF THE PREFERRED EMBODIMENTS

FIG. 1 shows an embodiment of the present thermosensor having an exposed thermistor element, and FIG. 2 shows another embodiment of the present thermosensor having a closed thermistor element, and FIG. 3 shows an embodiment of the present thermosensor having a closed thermocouple element.

In any case, a heat-sensitive element 1 is formed on one end of a two-holed ceramic tube 2 in which a pair of electrodes 3 (for example, Pt wires in case of the thermocouple; Pt wire and Pt-Rh alloy wire in case of the thermistor) are connected to two lead wires 4 made of a nickel alloy, for example, by welding at a position w and the lead wires are passed through each hole of the two-holed ceramic tube in a longitudinal direction thereof. Each of the lead wires is connected at the other end of the two-holed ceramic tube to, for instance, one of two copper stranded conductors 5 covered with glass fibers by means of a well-known sleeve joint 6. Thus, a thermoelectric change of the heat-sensitive element can be electrically signaled to the conductors.

The two-holed ceramic tube can be manufactured by a continuous extrusion molding in the form of straight line. A protective insulating tube 7 having an outward collar 8 is intimately engaged with the two-holed ceramic tube and closely fixed thereon, for example, by means of a phosphate cement.

In the embodiments of FIGS. 2 and 3, the protective insulating tube 7 has a thin closed end 7' adjacent to the outer periphery of the heat-sensitive element 1 and covered thereon. Consequently, the heat-sensitive element of thermistor or hot junction of thermocouple is protected from high temperature corrosive atmosphere, and for instance, against deposition or adhesion of electrically conductive substances in an exhaust gas. Except in a severe operation, however, the protective insulating tube 7 may be provided on the two-holed ceramic tube 2 in such a manner that the heat-sensitive element 1 is directly exposed in the atmosphere as shown in FIG. 1. When the heat-sensitive element is used to be exposed directly, there is the possibility that undesirable reaction is evolved in the thermistor element or a corrosion occurs in the hot junction of the thermocouple element. In such a case, the thermosensors as shown in FIGS. 2 and 3 may be used or a protective ceramic coating may be provided on the outer surface of the heat-sensitive portion in the case of the thermistor or a U-shaped protective ceramic tube (not shown) may be used in the case of the thermocouple.

In any case, the protective insulating tube 7 having the outward collar 8 can efficiently be manufactured, for example, by a rubber pressing method. On the outward collar 8 is fixed a metal fitting 9 composed of a threaded bush 9a, a clamping seat 9b and a fastening head portion 9c, in which the protective ceramic tube 7 is put through the metal fitting 9 with rings 10a, 10b and 10c annually packed therebetween and a calking bore 9d having a bottom formed inside the clamping seat 9b is filled with a powdery filler 11 such as talc and then a peripheral thin edge 9e of the metal fitting 9 is impinged annually inwards against the ceramic tube.

The thermosensor of the above described structure according to the present invention is secured into an opening of a casing such as a furnace or an exhaust pipe of an engine so as to measure temperature in the casing. The clamping seat 9b in the thermosensor is abutted to the wall of the casing through a packing means (not shown) to provide air tight seal with the casing. The heat-sensitive element 1 projected into the casing sends its thermoelectric change in response to the temperature in the casing. Furthermore, the lead wires of the signal transmission system are completely enclosed and supported independently in the two-holed ceramic tube, so that a long life is proved without any damage to the wires even under the corrosive atmosphere with the vibration action.

Now, a preferred embodiment of the present invention, that is, the thermosensor having a catalyst layer will be explained in detail below.

The thermosensor according to the present invention as shown in FIGS. 5 and 6 may be mounted on an exhaust gas purifying device as shown in FIG. 4.

Referring to FIG. 4, 21 represents an engine, 22 an exhaust pipe, and 23 a reactor or an afterburner or a catalytic converter.

23' represents an intake for secondary air, 23'' a side exhaust pipe, 24 a switching system for the side exhaust pipe, and 25 an exhaust port.

The thermosensor according to the present invention is preferably arranged just at the inlet of the reactor or catalytic converter or afterburner 23 as shown at the position A in FIG. 4. However, the thermosensor may be arranged between the intake 23' and the reactor 23 in any position.

Two thermocouples each set in the closed protective tube composed of 95% alumina porcelain as shown in FIG. 5 were provided as the thermosensor, one of which was made as a test sensor 2 for comparison and the other of which was processed as follows and made as a test sensor 1.

Namely, 15 mm of the end portion of the closed protective tube was applied with a slip mixture of 10:1 of clay and magnesite and dried and then baked at 1,300°C for 1 hour. Then, the thus coated portion was dipped in a slip mixture obtained by adding water to a mixture of gelatinous aluminum hydroxide and an equal amount (by dry weight) of clay and dried and then baked at 700°C for 30 minutes to form a carrier layer for catalyst. Thereafter, the thus obtained carrier was immersed in an aqueous solution of chloroplatinic acid containing 2.5% by weight $H_2PtCl_6·6H_2O$ and dried and then baked at 600°C for 30 minutes so as to deposit a platinum-catalyst layer on the outer surface of the protective tube.

An example of the test sensor 1 according to the preferred embodiment of the present invention is shown in FIG. 5, in which 1' represents a hot junction of the thermocouple, 7 a protective insulating tube surrounding the thermocouple, 5 a compensating conductor connected to an element 3 of the thermocouple, 9 a metal fitting, 12 a ceramic coating layer and 13 a catalyst layer.

Separately, two thermocouples each set in the closed protective tube composed of SUS 42 stainless steel were provided and then coated at the heat-sensitive portion with a ceramic coating obtained by using a mixture of 100 parts by weight of the frit having the composition shown in the following table, 1 part by weight of cobalt oxide, 26 parts by weight of aluminum oxide, 11 parts by weight of clay, 0.1 part by weight of citric acid and 50 parts by weight of water, respectively. One of these was further supported with a platinum-catalyst layer in the same manner as described just above and was made as a test sensor 3, and the other thermocouple was made as a test sensor 4 for the following comparison.

The test sensors 1 and 3 were arranged at the position A just at the inlet of the catalytic converter 23, while the test sensors 2 and 4 were arranged at the position C just at the outlet of the catalytic converter as shown in FIG. 4. The catalytic converter 23 was connected to the exhaust pipe 22 for a four cylinder-four cycle-1,600 cc gasoline engine using lead free gasoline. The engine was operated at a revolution number corresponding to 60 Km/hr.

In this operation, the temperature of the exhaust gas at the inlet of the converter was 300°C, and the concentration of carbon monoxide was 3% by volume, and the concentration of hydrocarbon was about 500 ppm, and the four sensors were set in advance in such a condition that each sensor reacts to electrically exhibit an overheat detetcting signal just when its heat-sensitive portion reaches 700°C.

The catalytic converter provided with the platinum catalyst smoothly worked during this operation and maintained a constant temperature of about 500°C. This temperature was determined by means of a naked hot junction of an alumel-chromel thermocouple placed in the said catalytic converter. Such a thermocouple was replaced at every engine stop in order to obviate an influence upon the test performance.

Then, an ignition circuit of one of engine cylinders was opened and the operation was continued by the remaining cylinders, whereby uncombustive fuel was incorporated in the exhaust gas. That means the concentration of uncombustive components increased in the exhaust gas.

At this moment, the temperature of the catalytic converter 23 rose up rapidly and was detected by the thermocouple placed to the converter reaching 800°C within about 20 seconds. In this period, the overheat detecting signal was obtained from each test sensor at the positions A and C.

Then, the exhaust gas was conducted from the converter into the side exhaust pipe 23'' by means of the switching system 24 and the temperature of the converter gradually lowered to 450°C. At that temperature, said opened ignition circuit was closed and the exhaust gas was again conducted from the side exhaust pipe 23'' into the converter 23 to restore the initial operating state. After the temperature of the converter reached 500°C, the ignition circuit of said one of cylinders was again opened. Such a procedure was repeated five times and then the engine was stopped and the alumel-chromel thermocouple placed in the catalytic converter was replaced by a new one, and subseqneutly the same procedure was repeated again. The response time of each sensor, which shows a sensitivity to a temperature change, being the shorter the response time, the sharper the sensitivity, was defined as the time the sensor spent just after said ignition circuit of the one of the cylinders was opened at the initial operating state until the sensor exhibits the overheat detecting signal. After the procedure was repeated 50 times, the response time of each sensor was determined to obtain the following result.

| Composition of frit (% by weight) | | | | | | | | | | |
|---|---|---|---|---|---|---|---|---|---|---|
| $SiO_2$ | $Al_2O_3$ | $B_2O_3$ | CaO | $K_2O$ | $Na_2O$ | $Fe_2O_3$ | NiO | CoO | $MnO_2$ | Total |
| 50.0 | 7.4 | 16.9 | 2.9 | 4.0 | 15.7 | 0.04 | 0.7 | 0.6 | 1.4 | 100.0 |

| | Average response time during temperature rising (sec.) | Position |
|---|---|---|
| Test sensor 1 | 9 | A |
| Test sensor 2 | 19 | C |
| Test sensor 3 | 9 | A |
| Test sensor 4 | 16 | C |

From the above results, it is seen that the response time of the test sensors 1 and 3 according to the preferred embodiment of the present invention relating to the damage of the catalytic converter due to overheating is shorter by about half of that of the test sensors 2 and 4. Thus, the better effect as the thermosensor is now attained when the thermocouple provided with the ceramic or metal protective tube coated with the catalyst layer is arranged just at the inlet of the catalytic converter.

It may be falsely understood that the test sensors 1 and 3 are positioned upstream to the exhaust gas as compared with the test sensors 2 and 4 so that the formers are faster in the response time than the latters. In fact, however, the flow rate of the exhaust gas during the operation of the engine is from 10 to 70 m/sec. and the distance between the positions A and C is set to about 50 cm so that the time of the gas to pass through the converter 23 between the distance AC is 1/20 – 1/140 sec. Consequently, the position of the test sensor gives little influence upon the response time during the above temperature rising. For this reason, the tests were made in the proper relation of the test sensors and of the positions thereof as described above.

As seen from the above results, the thermocouple provided only with the ceramic or metal protective tube (test sensors 2, 4) cannot expect a rapid response required for the prevention of overheating because the test sensors 2 and 4 are directly exposed to the temperature rising atmosphere and also the thermal conduction time from the protective tube, which is subjected to a radiant heat by the catalytic converter, through insulating particles such as magnesia powders filled therein, to the hot junction of the thermocouple is longer, while the hot junction of the thermocouple accelerates to response to the temperature change in naked use as that of the alumel-chromel thermocouple placed closely to the catalyst of the converter. Namely, such a use of the thermocouple is not suitable as a thermosensor for the prevention of overheating, i.e. for one of objects of the present invention in view of durability.

Now, the following experiment was made when the hot junction of the thermocouple is directly covered with a ceramic coating.

That is, two commercially available alumel-chromel thermocouples of 0.5 mm diameter were provided, and to about 15 mm of end portion of each of the thermocouples was adhered a paste of 10:1 of clay and magnesite and then baked at 1,300°C in a vacuum for 1 hour to form a ceramic coating layer. One of the thus treated thermocouples was immersed in a slip mixture obtained by adding water to a mixture of gelatinous aluminum hydroxide and an equal amount (by dry weight) of clay, dried and then baked at 700°C for 30 minutes to form a carrier layer serving as a promoter to fix a catalyst layer, and thereafter immersed in an aqueous solution of chloroplatinic acid containing 2.5% by weight of $H_2PtCl_6 \cdot 6H_2O$, dried and baked at 600°C for 30 minutes to form a platinum catalyst layer, which was made as a test sensor 5. The other thermocouple was immersed in a 10% aqueous solution containing chlorides of Cu and Cr in a molar ratio of 1:2 on a basis of $CuO:Cr_2O_3$, dried and baked at 700°C for 30 minutes to form a carrier layer and then a platinum catalyst was formed thereon in the same manner as described above, which was made as a test sensor 6.

Separately, the hot junction of commercially available platinum-platinum rhodium alloy (13% Rh) thermocouple was treated in the same manner as described above to form the same ceramic coating, carrier and platinum catalyst layers as in the test sensor 5, which was made as a test sensor 7. These sensors were tested in the same manner under the same conditions as already mentioned above together with the test sensor 1 to obtain the following results.

Each sensor was mounted at the position A, that is, just at the inlet of the catalytic converter 23.

|   | Response time during temperature rising (sec.) |
|---|---|
| Test sensor 1 | 9 |
| Test sensor 5 | 4 |
| Test sensor 6 | 3 |
| Test sensor 7 | 4 |

The feature that the test sensors 5–7 show the more excellent response time than the test sensor 1, is considered to be based on the fact that the thermal conductivity of the paths to the heat-sensitive elements has greatly improved.

When such a direct coating method on the hot junction was adopted to another heat-sensitive element, the thermistor, it was found that the coating components react with the thermistor components during the baking deteriorating the property of the thermistor and cracks occur in the coating layer due to the firing shrinkage of the coating. Namely, the direct coating method is impractical for the thermistor.

In the case of using the thermistor, the protective insulating tube may cover the thermistor and a catalyst layer may be formed on the outer surface thereof as previously mentioned with respect to the thermocouple provided with the protective tube, or otherwise the present invention may advantageously adopt the thermistor processed as follows.

For instance, a disc type thermistor element composed of $ZrO_2$ and CaO and having a diameter of 5 mm and a thickness of 1.5 mm, into which two platinum wires of 0.4 mm diameter are embedded in parallel at a width of 2 mm, is mounted on one end of a two-holed ceramic tube insulating and supporting said platinum wires, in which the platinum wires are connected to lead wires therethrough, respectively, and then the two-holed ceramic tube is inserted in an insulating tube, and a metal fitting is mounted on the insulating tube to assemble a thermistor unit. In an embodiment of the present invention, the thermistor element and the about 10 mm of the end portion of the two-holed ceramic tube are immersed in a molten paraffin to form a paraffin film having a thickness of 1 mm, and then immersed in a slip mixture of 10 parts by weight of a powdery blend of 85% $ZrO_2$ and 15% CaO, 0.8 part by weight of vinyl chloride-vinyl acetate copolymer, 3 parts by weight of acetone, 2 parts by weight of xylene and 1 part by weight of toluene to form a ceramic coating having a thickness of 0.5 mm. Then, the thus treated thermistor element is dried, heated up to 400°C in an oxidizing atmosphere over 10 hours to evaporate the paraffin film and the solvent in the ceramic coating, and then the temperature is raised up to 1,400°C, at which the thermistor element is maintained for 2 hours to prepare a ceramic capsulated thermistor. One of the thus ceramic capsulated thermistors is immersed in a slip mixture obtained by adding water to a mixture of gelatinous aluminum hydroxide and an equal amount (by dry weight) of clay and baked at 700°C for 30 minutes, and then immersed in an aqueous solution of chloroplatinic acid containing 2.5% by weight of $H_2PtCl_6 \cdot 6H_2O$, dried and baked at 600°C for 30 minutes to form a platinum catalyst layer, which was made as a test sensor 8. On the other hand, the remaining ceramic capsulated thermistor was made as a test sensor 9 without forming the catalyst layer.

One preferred embodiment of the thermosensor using the thus obtained thermistor such as described as the test sensor 8 is shown in FIG. 6, in which 1 represents the thermistor element, 2 a two-holed ceramic tube, 4 lead wires, 5 a compensating conductor, 7 a protective insulating tube, 9 a metal fitting, 14 a ceramic coating layer and 15 a catalyst layer.

Separately, a test sensor 10 was prepared in such a manner that on the surface of the thermistor element was formed a platinum catalyst layer by immersing the said element in a slip mixture obtained by adding water to a mixture of gelatinous aluminum hydroxide and an equal amount (by dry weight) of clay and then baking it at 700°C for 30 minutes, while a test senosr 11 was provided in such a manner that the thermistor element was just inserted in the ceramic tube without any treatment and on the end portion of the ceramic tube the platinum catalyst is supported in the same manner as described in the case of the test sensor 1. These four sensors were arranged at the position A just at the inlet of the catalytic converter and then tested under the same conditions as previously described to obtain the following results.

|  | Response time during temperature rising (sec.) |
| --- | --- |
| Test sensor 8 | 5 |
| Test sensor 9 | 10 |
| Test sensor 10 | 4 |
| Test sensor 11 | 9 |

As seen from the above table, the ceramic capsulated thermistor (8) provided with the catalyst layer according to the present invention shows a considerably fast response time as compared with the only ceramic capsulated thermistor (9).

The test sensor 10, in which the catalyst layer is directly formed on the surface of the thermistor element, is satisfactory in the response time, but causes disorder of the temperature indication as the temperature change is repeated, which is due to the fact that electrically conductive substances such as carbon and the like adhere to and deposit on the surface of the catalyst layer exposed in the exhaust gas, whereby rendering the resistivity of the thermistor varied, the test sensor 10 is also poor in the durability.

The test sensor 11 shows the substantially equal performance to the thermocouple provided with the protective tube as previously mentioned. This shows that the thermosensor 11 performs, as the thermistor using thermosensor, objects of the present invention.

When the thermosensors of the above described structures according to the present invention are used, the danger of damaging the exhaust gas purifying device due to the overheating can previously and precisely be detected and the serious problems associated with the after-treatment of the exhaust gas which have never been solved by the prior art can easily be obviated.

What is claimed is:

1. A thermosensor comprising a two-holed ceramic tube, a lead wire passing through each of the two holes, a heat-sensitive element connected to the lead wires at one end of the two-holed ceramic tube, an outer ceramic protective tube having an outwardly circular bulging portion or collar at about the middle of the length thereof, a tubular metallic casing coaxially supporting the protective tube and caulking over the circular bulging portion, and powdery fillers filled in the space between the protective tube and the metallic casing.

2. A thermosensor as claimed in claim 1, wherein said protective tube is extended to enclose said heat sensitive element and further comprising a catalytic layer formed on said enclosing end of the protective tube so as to prevent the attachment of uncombustive components onto the catalyst-covered heat-sensitive portion during the exposure to the exhaust gas flowing through the catalytic converter.

3. A thermosensor as claimed in claim 1, wherein said powdery filler is talc.

4. A thermosensor as claimed in claim 1, wherein at least one metal packing is inserted between the protective tube and the metallic casing caulked at the bulging portion so as to increase the sealing effect therebetween.

5. A thermosensor comprising a two-holed ceramic tube, a lead wire passing through each of the two holes, a heat-sensitive element connected to the lead wires at one end of the two-holed ceramic tube, an outer ceramic protective tube having a tubular hollow made large in diameter at one end and small in diameter at the other end and having an outwardly circular bulging portion or collar at about the middle of the length thereof, the said two-holed ceramic tube passing through the said hollow so as to expose the said heat-sensitive element from the end of the said small diameter hollow, an outer conductor connected to each of the lead wires at the other end of the two-holed ceramic tube in the said large diameter hollow, a tubular metallic casing coaxially supporting the protective tube and caulking over the circular bulging portion, and powdery fillers filled in the space between the protective tube and the metallic casing.

6. A thermosensor as claimed in claim 5, wherein said protective tube is extended to enclose said heat-sensitive element and further comprising a catalytic layer formed on said enclosing end of the protective tube so as to prevent the attachment of uncombustive components onto the catalyst-covered heat-sensitive portion during the exposure to the exhaust gas flowing through the catalytic converter.

7. A thermosensor as claimed in claim 6, wherein said powdery filler is talc.

8. A thermosensor as claimed in claim 6, wherein at least one metal packing is inserted between the protective tube and the metallic casing caulked at the bulging portion so as to increase the sealing effect therebetween.

9. A thermosensor comprising a thermistor, two lead wires attached to said thermistor, a sintered ceramic intermediate layer formed on the thermistor, and a catalytic layer formed on the said intermediate layer, wherein said intermediate layer is formed by the steps of
   a. immersing the thermistor into a molten organic compoundto form an organic compound-covered thermistor,
   b. dipping the organic compound-covered thermistor into a raw ceramic slip or paste to form a ceramic layer on the surface of the organic compound-covered thermistor,
   c. heating the ceramic layer to evaporate the organic compound therethrough, and
   d. sintering the ceramic layer to encapsulate the thermistor therein.

10. A thermistor as claimed in claim 9, wherein said organic compound is paraffin.

11. A thermosensor as claimed in claim 9, and further comprising a two-holed ceramic tube, said lead wire passing through each of the two holes and said thermistor being located at one end of the said two-holed ceramic tube, an outer ceramic protective tube having an outwardly circular bulging portion or collar at about the middle of the length thereof, a tubular metallic casing coaxially supporting the said protective tube and caulking over the circular bulging portion and powdery fillers filled in the space between the protective tube and the metallic casing.

12. A thermosensor as claimed in claim 11, wherein said powdery filler is talc.

13. A thermosensor as claimed in claim 11, wherein at least one metal packing is inserted between the protective tube and the metallic casing caulked at the bulging portion so as to increase the sealing effect therebetween.

14. A thermosensor as claimed in claim 9, and further comprising a two-holed ceramic tube, said lead wire passing through each of the two holes and said thermistor being located at one end of the said two-holed ceramic tube, an outer ceramic protective tube having a tubular hollow made large in diameter at one end and small in diameter at the other end, the said two-holed ceramic tube passing through said hollow so as projecting one end thereof from the said small diameter hollow and as terminating the other end in the said large diameter hollow, and an outer conductor connected to each of the lead wires in the large diameter hollow.

15. A thermosensor as claimed in claim 9, and further comprising a two-holed ceramic tube, said lead wire passing through each of the two holes and said thermistor being located at one end of the said two-holed ceramic tube, an outer ceramic protective tube having a tubular hollow made large in diameter at one end and small in diameter at the other end and having an outwardly circular bulging portion or collar at about the middle of the length thereof, the said two-holed ceramic tube passing through the said hollow so as projecting one end thereof from the said small diameter hollow and as terminating the other end in the said large diameter hollow, an outer conductor connected to each of the lead wires at the other end of the two-holed ceramic tube in the large diameter hollow, a tubular metallic casing coaxially supporting the protective tube and caulking over the circular bulging portion, and powdery fillers filled in the space between the protective tube and the metallic casing.

16. A thermosensor as claimed in claim 15, wherein said powdery filler is talc.

17. A thermosensor as claimed in claim 15, wherein at least one metal packing is inserted between the protective tube and the metallic casing caulked at the bulging portion so as to increase the sealing effect therebetween.

* * * * *